July 31, 1951  G. BRUNET  2,562,523
MEANS FOR FORMING TUBULAR PLASTIC CONTAINERS
Filed July 19, 1948  2 Sheets-Sheet 1

Inventor:
Gaston Brunet
by  Agent

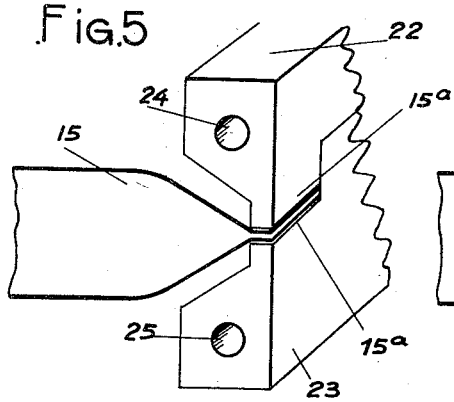
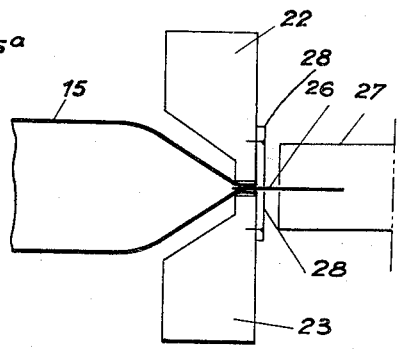
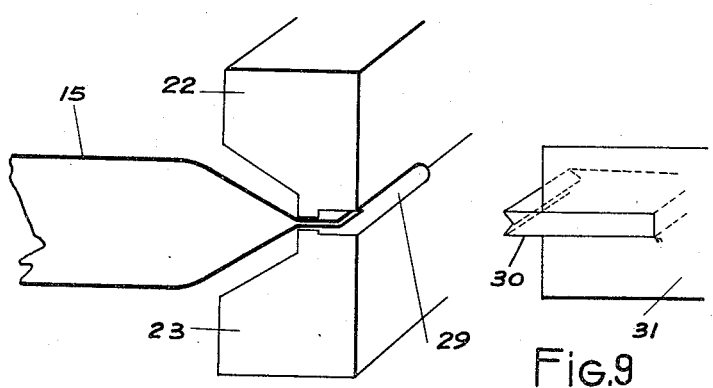
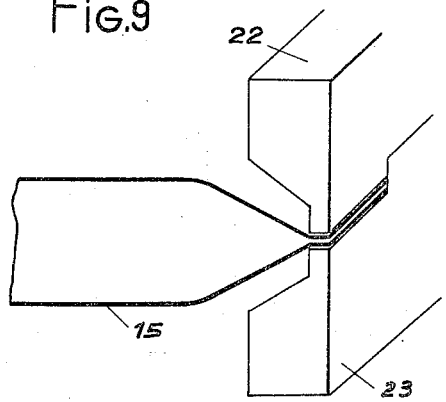
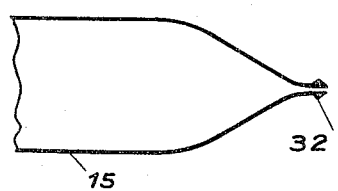

Patented July 31, 1951

2,562,523

UNITED STATES PATENT OFFICE 2,562,523

MEANS FOR FORMING TUBULAR PLASTIC CONTAINERS

Gaston Brunet, Tournus, France

Application July 19, 1948, Serial No. 39,558
In Switzerland July 26, 1947

6 Claims. (Cl. 18—5)

My invention relates to a method and means for manufacturing tubular containers out of plastic materials.

Most of the tubular containers to be filled with pastry and similar products are made of a metallic tube such as a tin tube, which must be put out of shape by pressing, in order to extract its contents.

In the majority of cases, such containers can be used only once because their deformation is not an elastic one and the successive foldings and crushings they have been submitted to are liable to have very strongly impaired their tightness and, moreover, because a new filling is unpractical without expensive reforming, cleaning, and the like. The only use of such worn out tube containers is limited to a remelting of the metal, in order to use it in a new tube manufacturing operation. Such recuperation necessitates storing, transporting and various manufacturing steps, by which the cost of the re-made tube is unduly loaded.

Finally, there yet remains the most important drawback that such tubes are relatively heavy and that when large amounts of them have to be transported, the load becomes important and limits the possibilities of transport, by reason of the costs involved in such transport.

Such tubes are easily damaged and in order to transport them in an empty or a filled condition, special partitioned packings varied according to the tube dimensions are necessary for their stocking and transport. On the other hand the various handling operations ought to be made with great care. Such tubes are uncompletely or difficultly emptied, particularly when containing dense pastes and it frequently happens that the tube is emptied through its rear end or is perforated. Finally the tubes have an unpleasant appearance when flattened out and their opacity makes impossible to see the paste contained in them.

My present invention relates to a means for manufacturing tube containers out of plastic materials, without intricate machinery or tools, and to new tubes obtained by such method and means.

According to my invention the means for manufacturing plastic tube containers comprises a device for moulding the tube head by injection, extruding the tube envelope, calibrating the envelope thus obtained by applying said envelope to an external calibrating barrel, shearing off the tail of the tube together with the said calibrating, and welding together the walls of said tail of the tube.

Tubes obtained according to said method may have any desired shape; they are elastically yielding and may be filled twice, if desired.

Plastic tubes according to the invention are light and strong. The may be stocked in the filled or in the empty state, loosely packed, and sent, without impairing their quality or appearance; they can be emptied by a slight pressure, even in the case of dense pastes and such emptying always occurs through the emptying opening; they can be wholly emptied without loosing their neat appearance. They may be transparent or opaque, the material out of which they are made being, if desired, charged with dyes or provided with any inscriptions.

According to my invention, the plastic material is injected into a mould which can be shifted in a calibrating barrel. The head of the tube is first formed in the said mould. When the head formation is achieved, the mould is shifted, being guided in said calibrating barrel, during which operation the continuous extruding of the tube envelope occurs. When the mould has been shifted through a distance corresponding to the desired length of the tube, said mould is stopped and compressed air is blown into the tubular envelope, thus inflating and sheaving the said envelope and pressing its walls on the inner walls of the calibrating barrel. Then the tube is closed by bringing together along a straight line the walls of the tube tail, and welding said walls after suitably pressing and heating them.

According to a modification, the extruding of said tube wall occurs in vacuo.

The following specification, with references to the annexed drawings, illustrates the manner in which my invention may be applied.

Figs. 5, 6, 7, 8 and 9 show various ways in which the tail of the said tube may be welded.

Figure 1:
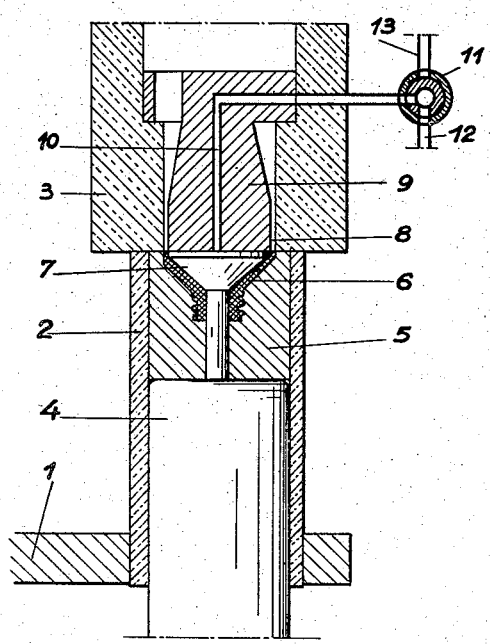
Fig. 1 shows in cross-section a device used for the application of the method, at stage of the tube head injection moulding.
Figure 3:
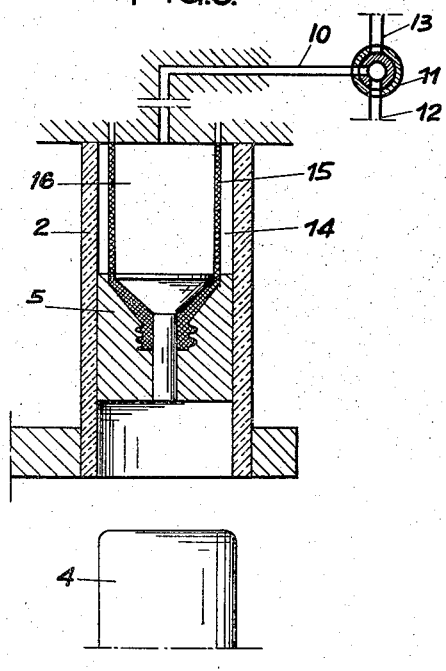
Fig. 3 is a view corresponding to Fig. 1, at the stage of extruding of the tube envelope.
Figure 4:
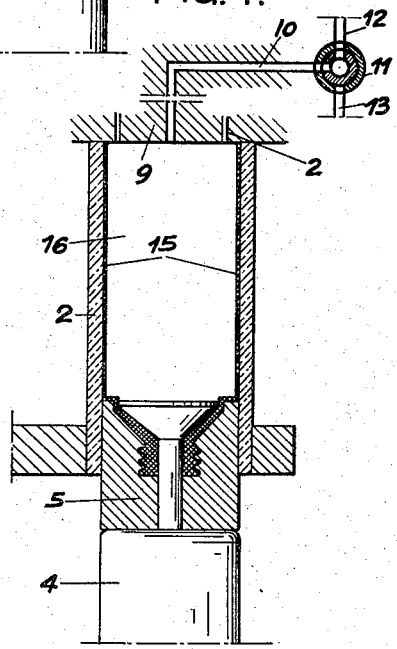
Fig. 4 shows the blowing and calibrating stage of manufacture of the tube container.

In Fig. 1, there is shown at 1 a revolving table in which a calibrating barrel 2 and the cylinder 3 of the press for plastic materials are fixed by any suitable means. In calibrating barrel 2 an abutment piston 4 and an injection mould 5 may slide. In the said injection mould there is provided a recess 6, partially obstructed by means of a conical plug 7 integral with the mould and formed to the inner shape of the tube head. The plastic material is injected between the walls of recess 6 and plug 7, through the annular passage provided between the injection and extrusion die 9 and the press cylinder 3. For such purpose, the diameter of the upper end of the plug is suitably adapted to that of the lower end of the die. Through press cylinder 3 and die 9 there is led a duct 10 which may be connected, by means of a two way cock 11 either with atmospheric air at 12, or with a compressed air pipe at 13. At the beginning of operations, piston 4 maintains mould 5 on the base of die 9 and of press cylinder 3. On the inside of the press a certain injection pressure is established and the plastic material, in the fluid state, passes through die 8 and fills mould 5. Duct 10 is then connected, through cock 11 with the surrounding atmospheric air at 12. Piston 4 then moves down in calibrating barrel 2 and takes the position shown in Fig. 3.

Under its own weight mould 5 moves down in calibrating barrel 2, while allowing the atmospheric air to pass between its sliding surface and the internal surface of calibrating barrel 2, and thus to fill up space 14 between the envelope 15 of the tube being manufactured and calibrating barrel 2. The tube is thus gradually formed from plastic material continuously brought up at the output of die 9.

When mould 5 has been shifted sufficiently to abut against piston 4, the extruding of the tube envelope is considered as terminated. The injection pressure of the plastic material is then interrupted, duct 10 is brought into connection with pipe 13 and compressed air is blown into space 16. This results in inflating the plastic tube and in applying the envelope 15 of said tube on the inner surface of calibrating barrel 2, the air being driven out through the output way comprised between mould 5 and the wall of calibrating barrel 2, after shearing of the tube tail along the periphery of die 9. The pressure then prevailing in space 16 prevents any further occasional penetration of plastic material through the orifice of die 8.

Figure 2:
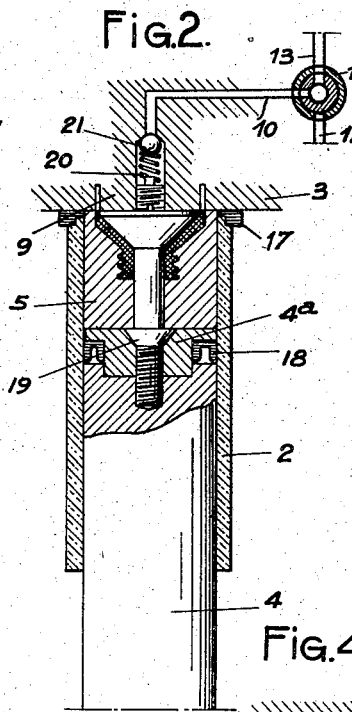
Fig. 2 shows a modification of the device shown in Fig. 1.

Fig. 2 shows a modification according to which the extrusion is made in vacuo. The device shown here differs from that shown in Fig. 1 in that Figs. 2 shows air-tight joints, at 17 and 18. Joint 17 which is resilient is inserted between calibrating barrel 2 and press cylinder 3, and joint 18, which may be of stamped leather for instance is located in a circular groove provided between piston 4 and piston head 4a, fixed to said piston by means of screw 19. Duct 10 ends in die 9 by a threaded bore of larger diameter in which there is located an adjusting spring 20 maintaining at the orifice of duct 10 a ball 21 acting as a valve. The extrusion of the plastic envelope of the tube is made in the following manner. After the head of the said tube has been injected, piston 4 moves down in the calibrating barrel, thus establishing a vacuum between the lower level of mould 5 and the upper level of piston head 4a. The device being air-tight, mould 5 is drawn towards piston head 4a, so as to fill the vacuum established by the displacement of the piston. The extrusion of the envelope begins and, owing to the air-tight joints, atmospheric air is unable to penetrate between the envelope of the extruded tube and the walls of the calibrating barrel. On the other hand, spring 20 is so adjusted that the depression established on the inside of the plastic tube cannot be balanced by air brought in through duct 10. Thus a vacuum is established on both sides of the walls of the plastic tube envelope. When the mould and piston have been shifted through a sufficient distance, there is effected, as in the case of Fig. 1, a blowing and a calibrating of the plastic tube envelope, by means of compressed air brought up through duct 10, the pressure of which exceeds that of spring 20. Thus, the plastic tube envelope can be applied at once on the wall of calibrating barrel 2, without having to wait for an air escape, as in the case of Fig. 1.

Figs. 5, 6, 7, 8, 9 show a plurality of ways for welding the tail of the tube.

In Fig. 5 the envelope of the tube is shown at 15 and the terminating lips of said tube are shown at 15a. The said lips are brought together with a suitable pressure between jaws 22 and 23, each of which is connected with one pole of a high frequency power generating device. The said jaws are cooled by means of a continuous flow of a cooling fluid through ducts 24 and 25.

On Fig. 6 is shown a method for butt-welding of the terminating lips, by means of internal heating through heat-conduction. A thin blade 26, of good heat-conducting properties, is inserted between the two lips to be welded. On the other hand, both lips are pressed between jaws 22 and 23, cooled by any suitable means. The free end of blade 26 is clamped in a heating mass 27. Heat is thus transmitted from mass 27 to the inner rims of the lips through blade 26. As the welding temperature has been reached, blade 26 is removed and the burrs of plastic material carried along by blade 26 are retained by parts 28 acting as scrapers, the said parts 28 being bad heat-conducting and being fixed to jaws 22 and 23 on each side of blade 26.

Fig. 7 shows a method for welding the said lips by end-pressing. The lips to be welded are pressed between two jaws 22 and 23, of a bad head-conducting material, in such a manner that part of said lips is projecting into recess 29 provided symmetrically in jaws 22 and 23. A punch 30 clamped between jaws of a heating mass 31 is inserted into recess 29 and welds the lips by pressing on them. This punch is kept in position during the welding and the jaws are not slackened until cooling. The welded end 32 of the plastic tube has then the shape shown in Fig. 8.

Fig. 9 shows a method of welding by means of alternatively heated and cooled jaws. The lips are clamped between two jaws 22 and 23 heated to the welding temperature. When the lips have reached the same temperature the jaws are cooled and the tube may then be removed. Such heating and cooling may be obtained by any suitable means.

The tubes obtained in the above described manner may be filled in a variety of ways.

If the end lips of the tube are welded on their brim, the said tube may be filled by injecting in it the pasty product to be packed, after establishing within said tube a relative vacuum either by suction, or by flattening out of its envelope.

In this case the emptying orifice is used as filling orifice and such filling is possible owing to the elasticity of the tube envelope.

The filling may also be made in the usual manner, through the rear end of the tube, the welding of the tail being then made after the said filling.

It must be well understood that numerous modifications may be applied to the above-described embodiments of my invention, within its scope, as defined by the appended claims. Particularly the calibrating barrel may be given any desired polygonal section, in order to obtain a plastic tube of identical polygonal section. Moreover, the closure of the tube tail may be obtained, instead of by welding, by a mere tightly bringing together of the lips, by means of a spring clip, or the like, which is left on the tube after filling and closure.

I claim:

1. The method of manufacturing tubular containers having a solid head portion and a very thin and resilient tubular portion out of plastic materials comprising the steps of supporting a head mold within a calibrating tube and adjacent to an annular orifice of less diameter than the calibrating tube, extruding material from the said orifice to fill the head mold, removing the support and extruding a tube while moving the head mold downwardly by its own weight, the said head mold being then resiliently supported by said tube only, said tube being stretched by the said weight, stopping the movement and terminating the extrusion, pressing said extruded tube to the inner wall of said calibrating tube by exerting fluid pressure inside said tubular portion, thereby also shearing the tail end of said tubular portion and finally closing the said tail end.

2. A method as set forth in claim 1, which includes the step of holding the head mold against the extruding die by means of a piston during the injection molding of the head portion of the container, lowering suddenly said piston to a predetermined position in correspondence with the length of the tubular portion of the container to be formed, said lowering permitting of said movement of said head mold, and holding the latter during its downward movement by means of additional plastic material extruded to form the tubular portion of said container.

3. The method as set forth in claim 1, which includes the step of interrupting the feeding plastic material when the additional plastic material extruded after the molding of the head portion of the container is sufficient to form the tubular portion of the container.

4. A method as set forth in claim 1, in which the exertion of the fluid pressure inside the tubular portion of the said container follows the molding step of the tubular portion after a time interval corresponding to the length of the tubular portion of the said container.

5. A method as set forth in claim 2, in which the length of the tubular portion of the container is determined by the lowest abutment position of the head mold against the piston in its lower position.

6. A method as set forth in claim 1, which includes creating a vacuum on the inside and outside of the extruded material forming the tubular portion of the container, and maintaining said vacuum up to the application of the fluid pressure inside of said tubular portion.

GASTON BRUNET.

REFERENCES CITED

The following references are of record in the file of this patent:

UNITED STATES PATENTS

| Number | Name | Date |
|---|---|---|
| 2,028,112 | Westin | Jan. 14, 1936 |
| 2,262,612 | Kopitke | Nov. 11, 1941 |
| 2,288,454 | Hobson | June 30, 1942 |
| 2,354,714 | Strickland | Aug. 1, 1944 |
| 2,365,375 | Bailey | Dec. 19, 1944 |
| 2,414,776 | Stephenson | Jan. 21, 1947 |
| 2,443,053 | Parmelee | June 8, 1948 |
| 2,451,986 | Slaughter | Oct. 19, 1948 |